United States Patent Office 3,705,015
Patented Dec. 5, 1972

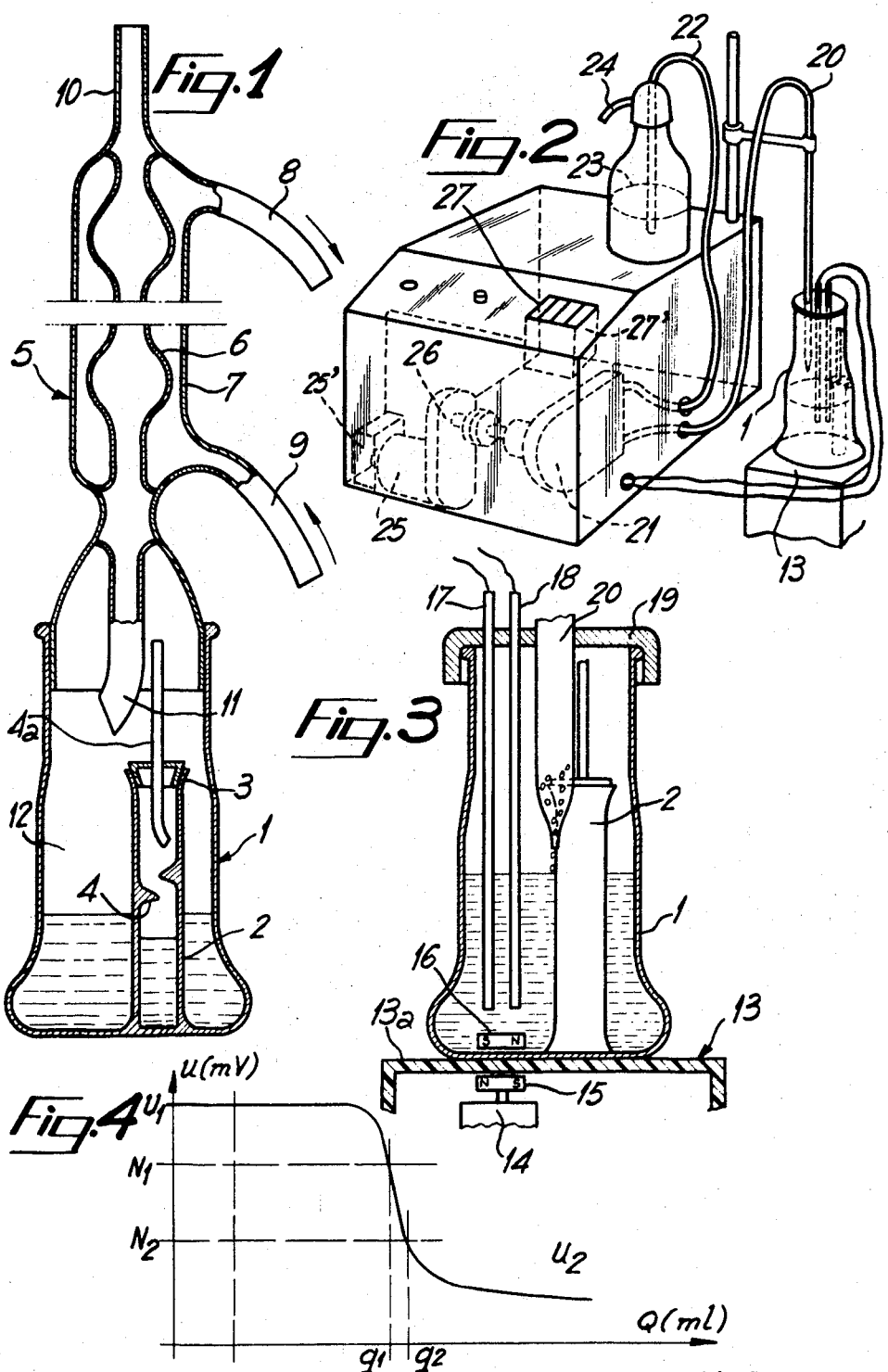

3,705,015
APPARATUS FOR DETERMINATION OF ALCOHOL TITER IN ALCOHOLIC LIQUIDS
David Bono, Maisons-Alfort, and Lucien Prud'hon, Ris-Orangis, France, assignors to Association des Ouvriers en Instruments de Precision, Paris, France
Filed Aug. 5, 1970, Ser. No. 61,234
Claims priority, application France, Aug. 7, 1969, 6927168
Int. Cl. B01n *31/16, 33/14, 25/14*
U.S. Cl. 23—253 R
9 Claims

ABSTRACT OF THE DISCLOSURE

An apparatus for the determination of the alcohol content of an alcoholic liquid, especially alcoholic beverages of the fermentation or distillation types. A small known quantity of the alcoholic beverage is heated to distill the alcohol thereof into a predetermined quantity of a mineral oxidizing agent of known concentration and present in excess. The alcohol is converted to acetic acid and the unreacted oxidizing agent is titrated with a reducing agent of known normality, the endpoint being detected by monitoring the redox potential. Increments of addition of the reducing agent are counted whereby the alcohol titer is read out directly upon a counter.

FIELD OF THE INVENTION

My present invention relates to a method of and to an apparatus determining the alcohol titer or content of aqueous alcoholic liquids and, more particularly, to a system for determining the alcohol content of alcoholic beverages of the fermented type (e.g. beer, malt liquors and wines) or liquids of the distillation type (e.g. commercial ethanol solutions, gin, vodka, brandy and whiskey).

BACKGROUND OF THE INVENTION

It has been proposed hitherto to determine the alcohol content of alcoholic liquids by a number of procedures, most of which require distillation of the alcohol content from the liquid and collection of the distillate. The latter is customarily titrated with a stock solution and the alcohol titer or concentration is calculated. These techniques have also been employed in evaluating the alcohol titer in degrees in alcoholic beverages. The latter may be of the distillation type, e.g. whiskeys, vodka, gin, rum, derived by biological and chemical transformation of carbohydrates, followed by distillation of the alcoholic liquor. Similar procedures have been followed for determining the alcohol titer of fermentation beverages, e.g. beers, malt liquors, wines, in which the alcohol is formed in situ by fermentation processes.

Attempts to use direct titration of alcohol in the beverage to determine the alcohol content thereof have proved to be generelly unsuccessful, since the organic components of such liquids (other than alcohol—i.e. ethanol—) enter into side reactions with the titrating agent to observe the results.

The prior-art processes mentioned above also are not entirely satisfactory. Firstly, the distillation of the alcohol, as generally performed, is a prolonged procedure and requires large samples. Secondly, the collection of the distillate is often difficult and the subsequent titration is not always of satisfactory precision.

OBJECTS OF THE INVENTION

It is, therefore, a principal object of the present invention to provide an improved process for or method of determining the alcohol content of alcoholic liquids which is free from the aforestated difficulties.

Another principal object is to provide an improved apparatus for carrying out this method in a simple and convenient manner.

It is a further object of the invention to provide an unproved method of and apparatus for determining the alcohol content of alcoholic beverages.

Also, it is an object of this invention to provide a system, effective in a short time span and with considerable precision, for determining the alcohol titer of distilled and nondistilled alcoholic beverages, and for directly indicating acid titer.

SUMMARY OF THE INVENTION

These objects and others which will become apparent hereinafter are attained, in accordance with my invention, by a process in which a small (several milliliters or less) quantity of the alcoholic liquid or beverage is heated to distill the alcohol contained therein quantitatively and directly (without intermediate collection) into an excess quantity of a mineral oxidizing agent, present in known concentration and volume, capable of quantitatively converting the distilled ethanol into acetic acid. The unconsumed mineral oxidizing agent is then titrated with a reducing agent to determine the amount of oxidizing agent consumed in the alcohol-acid oxidation reaction. Since the total quantity of reducing agent required to react all of the oxidizing agent originally provided is known, the difference between the reducing agent consumed and the maximum required indicates the quantity of oxidizing agent destroyed in the first step and hence the amount of alcohol reacted. Since the volume of the original sample is known, the concentration of alcohol or alcohol titer is determined.

According to a further feature of this invention, the mineral oxidizing agent consists of an acidic solution of potassium dichromate ($K_2Cr_2O_7$), the mineral acid being phosphoric and/or sulfuric acid. Advantageously, the oxidation reaction is accelerated by heating the oxidizing agent, preferably simultaneously and with the same means serving to heat the sample of alcoholic liquid from which the alcohol is distilled into the excess oxidizing liquid. The reducing agent, according to the invention, is advantageously a mineral reducing substance in aqueous solution and preferably the endpoint of the reduction reaction, in which the excess oxidizing agent is titrated, is determined by evaluating the oxidation-reduction potential (redox potential) with the aid of electrodes introduced into the solution. Upon the determination of an abrupt change in the potential across the redox-electrode system, the titration is terminated.

I have found the best results are obtained when the mineral reducing agent is Mohr's salt, i.e. a double salt of an ammonium sulfate and iron sulfate

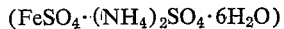

$$(FeSO_4 \cdot (NH_4)_2SO_4 \cdot 6H_2O)$$

Mohr's salt is employed in aqueous solution and has a reducing power which may be evaluated in terms of its ferrous sulfate content.

Still another feature of this invention resides in titrating the excess mineral oxidizing agent with aliquot quantities or increments of the mineral reducing agent while counting the increments of the latter added to the oxidizing agent and terminating the count with the aid of detection of the redox potential across the electrodes. Furthermore, when the counter originally shows a maximum alcohol titer and each increment represents the subtraction of a unit from the counter, the determined alcohol titer can be read directly from the counter scale.

In accordance with another aspect of the invention, the apparatus for carrying out the instant process comprises a single vessel subdivided internally into a small upwardly open compartment receiving the sample to be analyzed and a relatively large compartment receiving the oxidized agent. A common heating means is provided for both compartments of the vessel, while a reflux condenser may be provided thereabove to condense vapors emitted from the analysis compartment. The reflux condenser can be provided in usual manner with a cold jacket, the coolant preferably being water available from the usual municipal mains. It has been found that with such a system, the alcohol content of the sample may be quantitatively transferred to the oxidizing-agent compartment in a relatively short period.

The titrating apparatus for determining the excess mineral oxidizing agent, according to the present invention, comprises the aforementioned vessel, a pair of electrodes responsive to the redox potential of the reaction and means connected to the electrodes for terminating the operation of the volumetric titrating pump, e.g. a peristaltic pump having a signal-generating means for producing a train of pulses, each representing an increment of addition of the mineral reducing agent. Advantageously, a magnetic stirrer is employed during the titration to mix the solution, while a counter is connected as previously described to the signal generator and preferably deducts increments from the numerical value registered thereon, corresponding to the alcohol equivalent of the entire amount of the oxidizing agent used initially. The counter is triggered by the pulses of the pulse generator to deduct one unit per increment, whereby the counter directly reads the final alcohol titer of the sample.

DESCRIPTION OF THE DRAWING

The above and other objects, features and advantages of the present invention will become more apparent from the following description, reference being made to the accompanying drawing in which:

FIG. 1 is a vertical cross-sectional view, partly in diagrammatic form, of a vessel for carrying out the reactions of the present invention;

FIG. 2 is a diagrammatic perspective view of the remainder of the apparatus used in titrating the excess mineral oxidizing agent with the mineral reducing agent;

FIG. 3 is a vertical cross-sectional view, also in diagrammatic form, through the portion of the vessel containing mineral oxidizing agent during such titration; and FIG. 4 is a diagram of the potential across to the electrodes in the course of such titration.

Specific description

As best seen in FIG. 1, the principal reactions of the present invention are carried out in a vessel, preferably of glass, having a lower portion 1 constituting a flat-bottom flask and the bottom interior of which is provided with an upright tube to constitute the sample chamber of the present invention. The tube 2 reaches only part way up the vessel 1 and has a common bottom wall with a surrounding chamber 12 receiving the mineral oxidizing solution. Consequently, a common heat source, e.g. a hot plate, can heat both the mineral oxidant and the sample to be analysed. The mouth of the tube 2 is provided with a joint 3 receiving a complementary plug carrying a tube 4a, the lower end of which is curved toward the inner wall of the tube 2 and the free upper end of which extends to the upper end of the vessel 1. The tapered joints may be ground-glass joints provided wtih silicone grease to facilitate removal of a plug and tube 4a upon conclusion of the distillation course of the process. The inner wall of the tube 2 is, moreover, provided with inwardly extending, vertically staggered projections 4 which, together with tube 4a, prevent boiling liquid from the tube 2 from passing out of water into the vessel 12, thereby permitting only the alcohol vapors distilled from the tube 2 to enter the chamber 12. The tube 4a and the formations 4 together constitute a liquid trap which remains effective in spite of strong ebullition of the liquid sample within the tube 2.

The vessel 1 is surmounted by a reflux condenser, generally designated at 5 and comprising a central column 6 whose lower end is formed with a tube 11 turned away from the center of the vessel 1 and hence to the side of the tube 2 so that distillate will cascade directly into the liquid oxidant within the chamber 12 and will not accumulate upon the stopper of the tube 2. The column 6 is surrounded by a coolant jacket 7 to which a refrigerating liquid, e.g. city water, is led via a fitting 9 and is conducted away via a fitting 8, respectively located at lower and upper ends of the jacket. The upper end of the column 6 terminates in a tube 10 open to the atmosphere and preventing the development of pressure within the vessel 1. The junction between the reflux condenser 5 and the vessel 1 is preferably formed by a ground-glass joint, the receptacle forming the female member while the reflux condenser has an apron surrounding tube 12 and forming the male member of the tapered ground-glass joint. The joint is coated with a conventional silicone grease, capable of withstanding the heat developed in the system and enabling separation of the reflux condenser and the vessel.

In the titration phase, the vessel 1 is placed upon a magnetic stirrer 13 having a supporting surface 13a which is magnetically permeable but nonferromagnetic, below which is rotated a horizontal magnetic bar 15 by a motor 14. A magnetic stirring bar 16, consisting of a bar magnet coated with a substance inert to the reactants within the vessel 1, e.g. polytetrafluoroethylene—Teflon—. A pair of redox electrodes 17 and 18 is mounted in the cap 19 and extend into the solution within chamber 12.

These electrodes, conventional in the art of potentiometric titration, may include a platinum electrode which is spaced from a calomel electrode. The cap 19 also may carry a titrating tube 20, terminating just above the surface of the liquid within the vessel 1 and connected to a volumetric peristaltic pump 21 driven by a motor 25 through a speed-reducing gearing 26. The motor 25 is provided with a pulse generator 25' connected, as diagrammatically indicated in FIG. 2, with a counter 27' with scales as represented at 27. The motor, transmission 26, pump 21 and counter may be mounted in a common housing as diagrammatically illustrated in FIG. 2. The table of the housing may form a support for a vessel 23 containing the mineral reducing agent. A dip tube 22 reaches into the mineral reducing agent and continues through the peristaltic pump 21, while a vent 24 communicates with the atmosphere to prevent the buildup of a reduced pressure in the vessel 23. The tube 20 is held in a clamp upon a rod rising from this housing as is also apparent from FIG. 2.

In the initial stage of the method according to the present invention, using the assembly illustrated in FIG. 1, a small quantity of the liquid to be analysed, e.g. several cubic centimeters, in precisely predetermined quantity is added via a graduated pipet to the tube 2 prior to the insertion of the plug and tube 4a. Prior to mounting the reflux condenser 5 upon the receptacle 1, a precisely predetermined quantity, in excess of that necessary to oxidize all the alcohol of the liquid in compartment 2, of mineral oxidizing agent (potassium dichromate) in sulfuric acid or a mixture of sulfuric acid and phosphoric acid or phosphoric acid alone, is added to chamber 12. As noted, the quantity of this oxidizing agent is greater than that necessary to convert all of the alcohol contained in the liquid within the sample tube 2 to acetic acid.

The reflux condenser 5 is then mounted upon the vessel 1 and a coolant circulated through the jacket 7 as indicated. The bottom of the vessel 1 is heated, e.g. upon a hot plate, to distill all the alcohol from tube 2 via tube 4a into the compartment 12 and the mineral oxidizing agent therein. The vapors passing upwardly through the column 6 of the reflux condenser condense the droplets falling directly into the liquid mineral oxidant surrounding the tube 2. Since the liquid mineral oxidant is heated, it reacts more rapidly with the alcohol to convert it into acetic acid, thereby consuming the oxidizing agent. The distillation process generally takes only a few minutes (less than 10) and the distillation of alcohol is quantitative.

Thereafter, the reflux condenser 5 is removed and the magnetic-stirrer bar 16 dropped into the partially depleted mineral oxidant within the vessel 1, the assembly being placed upon the magnetic stirrer 13 as shown in FIGS. 2 and 3. The cap 19 is placed on the vessel 1 and the electrodes 17 and 18 are immersed therein. The electrodes are connected to an apparatus responsive to potential and coupled with the motor 25 to terminate the operation of the motor upon the detecton of a sharp change in the potential curve as represented diagrammatically in FIG. 4. In FIG. 4, I have plotted the potential U (in millivolts) along the ordinate against the quantity of mineral reducing agent added along the abscissa. The pump 25 is started, preferably by a pushbutton upon the housing, to deliver precisely metered quantities of the mineral reducing agent in precise increments to the vessel 1 while the solution therein is stirred as shown in FIG. 3.

As illustrated in FIG. 4, while the reducing agent is progressively added to the oxidizing solution, the voltage across the electrodes drops substantially suddenly at approximately the endpoint of the reaction, i.e. upon titration of all of the residual oxidizing power by the mineral reducing agent. As illustrated, the potential, falls from relatively higher value $U_1$ to a relatively low value $U_2$, the transformation taking place in a very short time span. This transformation is indicated by the substantially downwardly extending portion of the curve. The inflection point has a practically vertical tangent if the neutralization is extremely slow, i.e. the addition of the mineral reducing agent is in infinitesimally small increments. In practice, it is merely necessary to detect a potential change between the level $N_1$ to the level $N_2$, which potential change represents an error given by the difference $q_2-q_1$ in the quantity Q of the reducing agent necessary for total reduction of the excess oxidizing power of the solution within vessel 1. This difference is negligible. The potential drop from level $N_1$ to level $N_2$ is detected electronically by conventional means to produce a signal terminating operation of the motor 25.

At the outset, the counter 27 is previously set to a value corresponding to the alcohol equivalent of all of the oxidizing agent initially introduced to vessel 1, the counter is triggered incrementally by the motor 25 to reduce the recorded value by one unit for each increment of the reducing agent supplied. At the moment of termination of operation of motor 25, therefore, the scale 27 records the value precisely corresponding to the alcohol content or titer of the sample introduced into vessel 2.

In effect, the oxidation of ethyl alcohol proceeds in accordance with the following classical reactions:

$$CH_3—CH_2OH + \tfrac{1}{2} O_2 \rightarrow CH_3—CH=O + H_2O$$

$$CH_3—CH=O + \tfrac{1}{2} O_2 \rightarrow CH_3COOH$$

The oxidation of a molecule of alcohol to a molecule of acetic acid, therefore, requires a molecule of oxygen, i.e. four equivalents of hydrogen, each of which must be furnished by the potassium dichromate. At 20° C., ethyl alcohol in a pure liquid state has a density of 0.7894 and a molecular weight of 46.07. The molarity per liter of ethyl alcohol is therefore given by the relationship:

$$\frac{0.7894 \times 1000}{46.07} = 17.13 \text{ mole}$$

The oxidation of a milliliter of alcohol, therefore, requires $17.13 \times 4 = 8.52$ milliliters of a one normal solution of potassium dichromate in accordance with the oxidation-reduction relationships. The oxidation of the alcohol content of alcoholic beverage of alcohol titer T, consequently, is given by the relationship $$Q = \frac{68.52 \times T}{100} \text{ milliliters}$$

If the compartment 12 contains originally A milliliters of a one normal solution of potassium dichromate and one supplies B milliliters of the beverage of the titer T, the quantity molar N (in milliliters) of the reducing agent (assume to be a one normal solution of ferrous sulfate) to titrate the excess of the oxidizing agent will be given by the relationships:

$$N = A - B \times \frac{68.52 T}{100}$$

In the practical application of the process of the present invention, A, i.e. the quantity of the oxidizing agent used originally, is 20 milliliters and B is two milliliters.

The alcohol titer T of the liquid is then given by the relationship:

$$T = 14.594 - 0.7297 n$$

$n$ being the number of milliliters of a one normal ferrous sulfate solution consumed in the oxidizing excess.

This choice of the liquid quantities thus permits the determination of the alcohol titer of the alcoholic beverage up to about 14°, i.e. practically all of the liquid generally obtained by simple fermentation of carbon hydrates. The impulses provided by the pump 21 can be calibrated in hundreds of a milliliter so that the value 14.59 can be previously set on the counter scale 27, whereby the exact alcohol titer can be read directly from the scale. If the alcohol titer of the beverage is greater than 14° but less than 28°, it is merely necessary to reduce the quantity of the titrated beverage to 1.00 and to multiply the result read upon scale 27 by two. If the titer lies between 28° and 56°, only 0.50 ml. of beverage is employed and the result read upon the scale is multiplied by four.

By permitting small quantities of the alcoholic liquid to be used, as indicated, not only is the process accelerated, but it is possible to analyze extremely strong beverages. Where required the analysis of beverages such as strong gins and vodkas can be facilitated by augmenting A, i.e. the quantity of potassium dichromate, to 50 or 100 ml.

While I have described the invention as applicable primarily to alcoholic beverages, it should be noted that it is equally applicable to any solutions containing alcohol but has been found most satisfactory for the rapid determination of the alcohol titer of wines.

The improvement described and illustrated is believed to admit of many modifications within the ability of persons skilled in the art, all such modifications being considered within the spirit and scope of the invention except as limited by the appended claims.

I claim:

1. An apparatus for determining the alcohol content of an alcoholic liquid, comprising a vessel internally subdivided into an upwardly open relatively small compartment for receiving a sample of said liquid and an upwardly open relatively large compartment for receiving a solution of a mineral oxidizing agent; a condenser mounted on said vessel and having a distillate-discharge end directed toward said relatively large compartment; and common means for heating the contents of said compartments.

2. The apparatus defined in claim 1, further comprising means for titrating said oxidizing agent in said large compartment with a mineral reducing agent; and redox-electrode means immersible in the contents of said relatively large compartment for indicating the endpoint of the titration.

3. The apparatus defined in claim 2 wherein said titrating means includes a pump for metering increments of said reducing agent into said relatively large compartment; a pulse generator operatively connected with said pump for producing a train of pulses representing said increments; and a pulse counter operatively connected to said pulse generator for registering said pulses.

4. The apparatus defined in claim 3 wherein said counter initially is settable to register a value representing the quantity of said solution initially introduced into said relatively large compartment and is triggered by said pulses to deduct increments from said value.

5. The apparatus defined in claim 4 wherein said electrode system comprises a platinum electrode and a calomel electrode.

6. The apparatus defined in claim 1 wherein said vessel is a flat-bottom glass receptacle provided with an upwardly extending tubular portion of glass having a lower end sealed to said bottom and forming said small compartment.

7. The apparatus defined in claim 6 further comprising a removable liquid trap tightly engaging the other end of said tubular portion.

8. The apparatus defined in claim 7 further comprising a magnetic stirrer cooperating with said vessel for mixing the contents thereof.

9. The apparatus defined in claim 8 further comprising means for titrating said oxidizing agent in said vessel with a mineral oxidizing agent, the last mentioned means including a pair of electrodes extending downwardly into said vessel, means for mitering the mineral oxidizing agent into said vessel and means for automatically indicating the alcohol titer of said liquid upon indication by said electrode of the end point of the titration.

References Cited

R. Gibson, J. G. et al.: Journal of Biological Chemistry, vol. 126, pp. 551–59 (1938).

S. Kozelka, F. L. et al.: Analytical Chemistry, vol. 13, pp. 905–7 (1941).

T. Williams, M. B. et al.: Analytical Chemistry, vol. 22, pp. 1556–61 (1950).

MORRIS O. WOLK, Primary Examiner

E. A. KATZ, Assistant Examiner

U.S. Cl. X.R.

23—292